Figure 3:
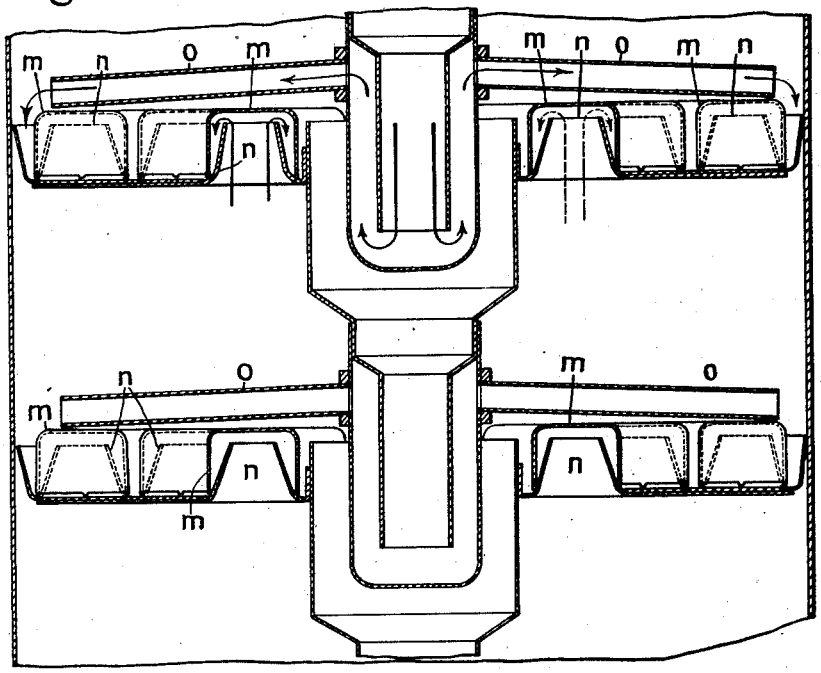

Nov. 8, 1938.  H. KÜHNI  2,136,139
BUBBLE PLATE FOR CONTACTING GASES AND LIQUIDS
Filed Jan. 22, 1936  2 Sheets-Sheet 1
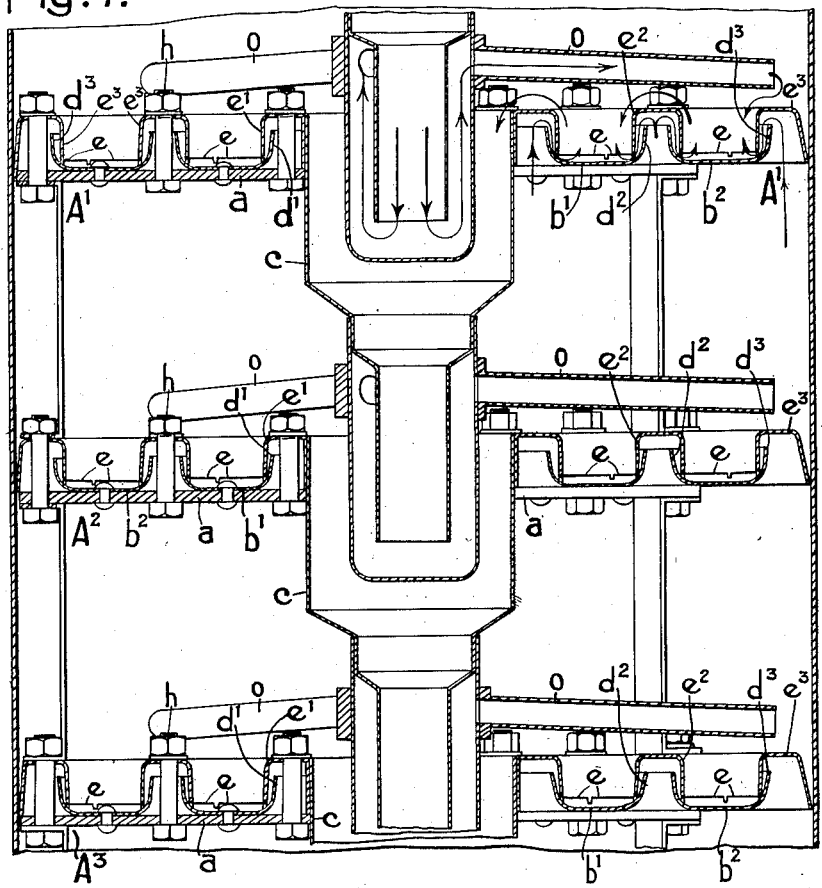
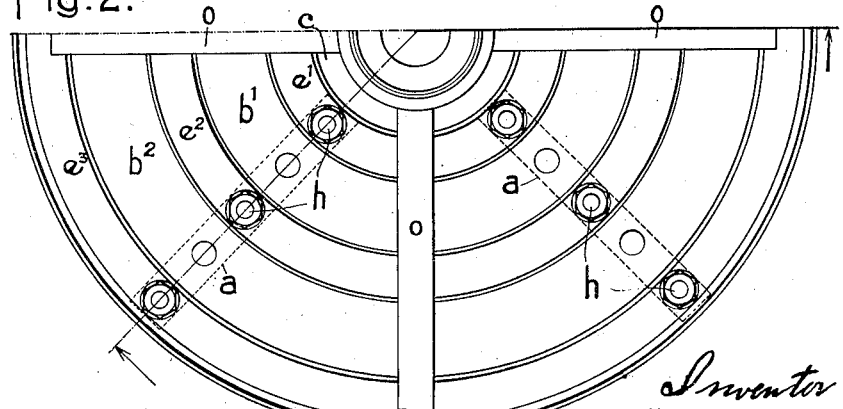

Nov. 8, 1938.  H. KÜHNI  2,136,139
BUBBLE PLATE FOR CONTACTING GASES AND LIQUIDS
Filed Jan. 22, 1936   2 Sheets-Sheet 2

Patented Nov. 8, 1938

2,136,139

UNITED STATES PATENT OFFICE 2,136,139

BUBBLE PLATE FOR CONTACTING GASES AND LIQUIDS

Hans Kühni, Basel, Switzerland, assignor to L'Air Liquide Societe Anonyme pour l'Etude et l'Exploitation des Procedes Georges Claude, Paris, France Application January 22, 1936, Serial No. 60,312 In Switzerland January 24, 1935

6 Claims. (Cl. 261—114)

In the process of rectifying mixtures of liquids the bubble plates or trays are well known and used for contacting gases with liquids. These plates are provided with upstanding tubes or chimneys whose upper end is disposed within coaxial bubble caps which are cylindrical or frustoconical. The vapor issuing from a plate next below ascends the chimneys of a plate and flows downwards through the annular space between each chimney and the corresponding cap and at last escapes through openings, that are provided at the lower part of the caps, in order to be subjected to a contact as intimate as possible with the liquid which is conducted to the tray from the plate next above.

The present invention relates to bubble plates or partitions with chimneys and corresponding caps and aims to avoid the risk of the gas exit openings of the caps becoming clogged and to simultaneously obtain a high rectifying effect by means of a special manner of discharging the gas into the liquid of the plate. To this effect, the side walls of the chimneys are inclined downwards to the bottom of the plate and placed in relation to the side walls of the corresponding caps in such a manner that they form an upright annular nozzle in which the gas passage between them becomes progressively narrower towards the horizontal gas exit opening, which is continuously open or by places interrupted and has advantageously a width of at most 3 mm., so that the gas is projected against the bottom of the plate in form of an inclined annular jet and with such a speed through said outlet or exit opening of the ring nozzle that while sweeping the bottom surface in a thin layer an intimate contact between gas and liquid is effected and simultaneously any solid deposit is avoided.

The chimneys may be annular and in this case an annular channel for receiving the liquid is formed between two opposite chimneys.

The accompanying drawings illustrate two examples of devices embodying the object of the present invention and show, in vertical section (Figs. 1 and 3) parts of cylindrical columns comprising superimposed plates and in top view (Figs. 2 and 4) a part of a plate of said columns, whereby in both cases a vapor is used as contacting gas.

In the Figures 1 and 2 the column is provided with a number of superimposed plates $A^1$, $A^2$, $A^3$. . . ., which are mounted upon radial bars $a$. Each of the plates presents annular trough-shaped channels $b^1$, $b^2$, that are riveted to the bars and are placed concentrically around an overflow pipe $c$, situated in the centre of the plate and are separated by a certain distance the one from the other. The channels $b^1$, $b^2$ form between them annular chimneys $d^1$, $d^2$, $d^3$ for the distribution of the vapor issuing from below. Annular caps $e^1$, $e^2$, $e^3$ are disposed over the chimneys for reversing the flow of the ascending gases and distribute them. These caps, which rest on the walls of the elements $b^1$, $b^2$, are maintained in position by means of bolts $h$ attached to the bars $a$ so as to form a solid framing. Their side walls are so formed at their lower edge as to reserve an opening $e$ for the outlet and distribution of the gas. The side walls of the chimneys $d^1$, $d^2$, $d^3$, which are inclined owing to the trough-shaped form of the channels $b^1$, $b^2$, are so placed in relation to the side walls of the caps that they form with the latter an upright ring nozzle which progressively becomes narrower in direction of the gas exit opening, the latter being continuously open or interrupted by places horizontally round about and having advantageously a width of at most 3 mm.

Thanks to this particular construction of the chimneys and caps the gas flowing from below through the chimneys $d^1$, $d^2$, $d^3$ is delivered in the form of an oblique, substantially uninterrupted annular jet through the horizontal opening of advantageously 3 mm. width with an increased speed against the bottom of the annular channels formed between two opposite chimneys and receiving the liquid; thereby an intimate contact between gas and liquid is obtained and any deposits in the channels are simultaneously prevented, for the speed of the vapor uniformly distributed into the liquid and sweeping the liquid from below along the whole bottom surface of the plate in form of a thin layer causes such an ascending movement that also the solid particles, whose specific weight is higher than that of the liquid are carried up from a channel to the other and finally into the overflow pipe, while the vapor is brought into thorough and intimate contact with the liquid. Therefore accumulation of solid particles in the channels and clogging of the openings $e$ are prevented. For the rest this bubble plate system also comprises the realization of all the other aforesaid factors and conditions affecting the efficiency of the system.

Relating to the course to be followed by the liquid in the column it will be noted that this course starts from the overflow pipe $c$ of the upper plate in the direction of the arrows shown in full lines and the liquid is conducted by means of distributing pipes $o$ into the external annular channel of the plate; from this channel the liquid flows in a radial direction towards the centre of the plate over the caps into the liquid receiving channels, the one after the other, and finally is discharged into the overflow pipe in order to circulate in a same manner on the plate next below. Any solid particles are carried with the liquid downwards on all plates and are discharged at the bottom of the column. The course of the vapor which has been always above explained is indicated by dotted arrows.

In addition, a satisfactory single-direction cross current of the liquid in relation to the vapor is obtained on all bubble plates or partitions by the above described liquid supply arrangements. The resulting continuous progress of the rectification is of considerable importance as regards the efficiency of the plate or partition as compared with the irregular direction of the liquid involved by previous constructions. Furthermore, with this radial inward conduction of the liquid the harmful effect of the drop in level of the liquid upon the vapor distribution can be completely compensated even with quite large plates or partitions. The effect of the drop in level of the liquid on the plate or partition towards the overflow shows itself in an increase of the vapor quantity per unit of area in this direction.

This harmful effect is compensated in the said mode of liquid conduction with suitable choice of the diameter of the overflow in relation to the outer diameter of the plate or partition, by the continual reduction in the width of the liquid path which this arrangement gives and the increasing specific flow in accordance with the rate of the reduction. In this way a uniform passage of the liquid through the vapor is obtained automatically over the whole section of the plate or partition.

In order that the streams of vapor oppositely directed do not provoke the upward entrainment of the liquid, the ring nozzles which are situated the one opposite the other must be placed at a sufficient distance the one from the other. The distance is in relation, as it is to be understood, with the width of the annular channels formed between two opposite chimneys. It has been found by experiment that this width must be at least as large as the height of the channels.

The size of the width of the channels is of very particular importance in connection with the successive overfall of the liquid down to the bottom of each channel. Experiments have proved that liquids which have a tendency to form with gas an abundant froth or foam do not reach the bottom of the channels, as is desired and convenient, but pass along over the caps. For increasing the speed of the rectification process it is however of great importance that the froth or foam always again falls in liquid and that this liquid is again contacted with fresh vapor.

The froth i. e. the mixture of gas and liquid must be separated into its elements during its flowing over the caps, that is in the period during which it is not subjected to a heat exchange, the vapor must flow upwards in a dry state and the liquid must fall down to the bottom of the next channel in consequence of its restored density. The width of the liquid receiving channels and of the caps must therefore be chosen large enough according to the tendency of the liquid mixture to form froth.

Figure 4:
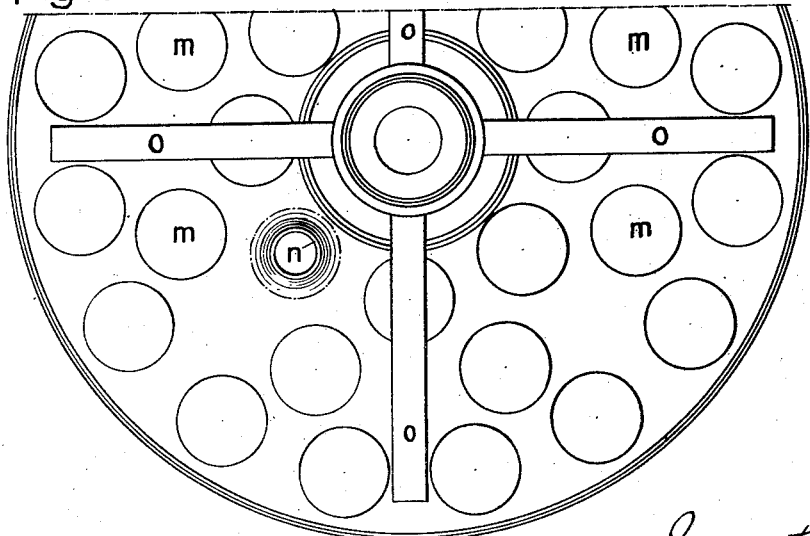

The column represented in Figs. 3 and 4 is similar to the column represented in Figs. 1 and 2, in relation with its construction, but in this embodiment the chimneys $n$ are of a frusto-conical form and the covering caps $m$ are of a cylindrical form, each chimney and its corresponding cap constituting a bubbler unit, which, in contradistinction to the annular plate, is independent from parts of other bubbler units.

What I claim is:—

1. A bubble plate for contacting gases and liquids in rectifying, washing and like columns, which comprises chimneys having side walls inclined downwardly to the horizontal bottom of the plate and curved surfaces into which run said side walls, said curved surfaces merging tangentially into the horizontal bottom of the plate, covering caps the side walls of which form with the side walls of the chimneys downwardly narrowing passages, vertical openings formed between the lower edges of the side walls of said caps and the curved surfaces of the chimneys; the horizontal distance between a chimney and the corresponding cap in the horizontal plane of the exit opening of said downwardly narrowing passage and comprising the lower edge of the side walls of said caps, being sufficiently small for the gas issuing from said exit opening to form a thin inclined stream which is guided by the curved surface of the chimney after its issue from the vertical opening formed between the lower edge of the side walls of the caps and said curved surface and undersweeps the liquid along the horizontal bottom of the plate.

2. A bubble plate for contacting gases and liquids in rectifying, washing and like columns, which comprises chimneys having side walls inclined downwards to the horizontal bottom of the plate and a curved surface into which run said side walls, said curved surface merging tangentially into the horizontal bottom of the plate, covering caps the side walls of which form with the side walls of the chimneys a downwardly narrowing passage, said caps resting on the curved surface of the chimneys by means of apart distant projections, openings formed between said projections for the issue of the gas from the caps, the horizontal distance between a chimney and the corresponding cap in the horizontal plane of the exit opening of said downwardly narrowing passage and comprising the uppermost part of the edge of the openings formed between the projections of the caps being sufficiently small for the gas issuing from said exit opening to form a thin inclined stream which is guided by the curved surface of the chimney after its issue from the said openings formed between the projections of the caps and undersweeps the liquid along the horizontal bottom of the plate.

3. A bubble plate for contacting gases and liquids in rectifying, washing and like columns, which comprises chimneys having side walls inclined downwards to the horizontal bottom of the plate and a curved surface into which run said side walls, said curved surface merging tangentially into the horizontal bottom of the plate, covering caps the side walls of which form with the side walls of said chimneys a downwardly narrowing passage, said caps resting on the chimneys by means of apart distant projections, openings formed between said projections for the issue of the gas from the caps, the horizontal distance between a chimney and the corresponding cap in the horizontal plane of the exit opening of said downwardly narrowing passage and comprising the uppermost part of the edge of the openings formed between the projections of the caps being sufficiently small for the gas issuing from said exit opening to form a thin inclined stream which is guided by the curved surface of the chimney after its issue from the said openings formed between the projections of the caps and undersweeps the liquid among the horizontal bottom of the plate.

4. A circular bubble plate for contacting gases and liquids in rectifying, washing and like columns, which comprises annular trough-shaped elements having outwardly inclined side walls and curved surfaces between the horizontal bottom of the trough-shaped element and said side walls, said trough-shaped elements being disposed concentrically and separated the one from the other to form annular chimneys having inclined side walls and curved surfaces merging into the horizontal bottom of the trough-shaped elements, annular caps disposed over the said chimneys, the said annular caps resting on the chimneys by means of apart distant projections, openings formed between said projections for the issue of the gas from the caps, bars extending radially under the horizontal bottom of the successive annular trough-shaped elements so as to bridge the lower openings of the chimneys and fixed to said elements, bolts passing through the said bars, said chimneys and the top wall of the corresponding caps and means bearing on said bars and said top walls for tightening the caps against the chimneys.

5. A bubble plate for contacting gases and liquids in rectifying, washing and like columns, which comprises annular trough-shaped elements having outwardly inclined side walls and curved surfaces between the horizontal bottom of the trough-shaped element and said side walls, said trough-shaped elements being disposed concentrically and separated the one from the other to form annular chimneys having inclined side walls and curved surfaces merging into the horizontal bottom of the trough-shaped elements, annular caps disposed over the said chimneys, the side walls of the caps forming with the side walls of said chimneys downwardly narrowing passages, a vertical opening formed between the lower horizontal edge of the side walls of the annular caps and the curved surfaces of the chimneys, the horizontal distance between a chimney and the corresponding cap in the horizontal plane of the exit openings of said downwardly narrowing passages and comprising the lower edge of the side walls of the annular caps being sufficiently small for the gas issuing from said exit openings to form thin inclined streams which are guided by the curved surfaces of the chimneys after their issue from the vertical opening formed between the lower edge of the side walls of the annular caps and said curved surfaces and undersweep the liquid along the horizontal bottom of the trough-shaped elements.

6. A bubble plate for contacting gases and liquids in rectifying, washing and like columns, which comprises annular trough-shaped elements having outwardly inclined side walls and curved surfaces between the horizontal bottom of the trough-shaped elements and said side walls, said trough-shaped elements being disposed concentrically and separated the one from the other to form annular chimneys having inclined side walls and curved surfaces merging into the horizontal bottom of the trough-shaped elements, annular caps disposed over the said chimneys, the side walls of the caps forming with the side walls of said chimneys downwardly narrowing passages, said annular caps resting on the incurved surfaces of the chimneys by means of apart distant projections, openings formed between said projections for the issue of the gas from the caps, the horizontal distance between a chimney and the corresponding cap in the horizontal plane of the exit openings of said downwardly narrowing passages and comprising the uppermost part of the edge of the openings formed between the projections of the caps being sufficiently small for the gas issuing from said exit openings to form thin inclined streams which are guided by the curved surfaces of the chimney after their issue from the openings formed between the projections of the caps and undersweep the liquid along the horizontal bottom of the trough-shaped elements, bars extending radially under the horizontal bottom of the successive annular trough-shaped elements so as to bridge the lower openings of the chimneys and fixed to said elements, bolts passing through the said bars, said chimneys and the top wall of the corresponding caps and means bearing on said bars and the top wall of said caps for tightening the caps against the incurved surfaces of the chimneys.

HANS KÜHNI.